United States Patent
Clark et al.

(10) Patent No.: US 6,519,707 B2
(45) Date of Patent: Feb. 11, 2003

(54) METHOD AND APPARATUS FOR DYNAMIC POWER CONTROL OF A LOW POWER PROCESSOR

(75) Inventors: Lawrence T. Clark, Phoenix, AZ (US); Bart McDaniel, Phoenix, AZ (US); Jay Heeb, Phoenix, AZ (US); Tom J. Adelmeyer, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/951,109

(22) Filed: Sep. 10, 2001

(65) Prior Publication Data

US 2002/0083355 A1 Jun. 27, 2002

Related U.S. Application Data

(63) Continuation of application No. 09/302,560, filed on Apr. 30, 1999, now Pat. No. 6,425,086.

(51) Int. Cl.$^7$ .............................. G06F 1/32; G06F 1/08
(52) U.S. Cl. ..................................................... 713/322
(58) Field of Search ........................... 713/322, 500, 713/501, 600, 601, 320

(56) References Cited

U.S. PATENT DOCUMENTS

| | | | | | |
|---|---|---|---|---|---|
| 5,727,208 A | * | 3/1998 | Brown | ........................ | 713/1 |
| 5,760,636 A | * | 6/1998 | Noble et al. | ................ | 307/117 |
| 5,774,704 A | * | 6/1998 | Williams | .................... | 713/501 |
| 5,812,860 A | * | 9/1998 | Horden et al. | .............. | 327/113 |
| 6,141,762 A | * | 10/2000 | Nicol et al. | ................. | 709/100 |
| 6,425,086 B1 | * | 7/2002 | Clark et al. | ................. | 713/322 |

\* cited by examiner

*Primary Examiner*—Glenn A. Auve
(74) *Attorney, Agent, or Firm*—Blakely, Sokoloff, Taylor & Zafman LLP

(57) ABSTRACT

Briefly, in accordance with one embodiment of the invention, a system includes: a processor, a voltage regulator, and a memory. The voltage regulator is coupled to the processor to adjust the operating voltage of the processor. The memory is coupled to the processor by a memory bus. The memory has stored on it processor instructions that, when executed by the processor, result in modification of the operating frequency of the processor and result in adjustment of the operating voltage of the processor, based, at least in part, on dynamic changes in the processing load of the processor.

21 Claims, 3 Drawing Sheets

METHOD AND APPARATUS FOR DYNAMIC POWER CONTROL OF A LOW POWER PROCESSOR

RELATED APPLICATION

This is a continuation patent application of patent application Ser. No. 09/302,560, filed on Apr. 30, 1999, now U.S. Pat. No. 6,425,086 titled "Method And Apparatus For Dynamic Power Control Of A Low Power Processor," by Clark, et al., assigned to the assignee of the present invention and herein incorporated by reference.

BACKGROUND

1. Field

The present invention is related to processors, and, more particularly, to dynamic power control of low power processors.

2. Background Information

Achieving significant power savings in embedded processors, such as microprocessors, for example, and other digital systems is becoming increasingly desirable. One reason is the increase in the use of cell phones and other hand-held portable devices having limited battery capacity. In addition, the computing power of such hand-held devices is increasing as the technology evolves, and will continue to increase for the foreseeable future. This is particularly likely with the addition of digital signal processing and communications capability to such devices and systems, as well as software applications, such as voice recognition, which will predictably utilize and potentially drive this increasing computational demand.

In systems that employ such processors, it is not unusual for the battery voltage to tend to be higher than a particular voltage level employed for successful operation and, therefore, voltages provided by the battery are often stepped down, such as via a voltage regulator. Another reason a higher voltage may be provided is that modern high frequency silicon fabrication processes for processors, such as microprocessors, tend to tolerate lower voltages than the processes employed to fabricate other components. Therefore, typically the regulators provide multiple output levels of voltage for different components of the system. Furthermore, as the batteries wear out, typically the voltage output level drifts downward and, therefore, voltage regulators are also employed in this context to provide a substantially consistent operating voltage over the battery life. Recently, more complex regulators that provide the capability to switch between step down and step up operation have become available and may be useful in this environment. Such a regulator steps the battery voltage down when the battery is relatively new or recharged, and steps the voltage up when that voltage has degraded over time to a level which is insufficient to proper operation of the system, thereby extending the useful battery lifetime.

As is well known, power consumption is related to the voltage level of the voltage supply by the following equation: $P=C(V_{dd})^2 F$, where F is the operating frequency, C is the switched capacitance, and $V_{dd}$ is the power supply voltage. As this equation demonstrates, power may be significantly reduced by lowering the voltage level of the supply voltage. Unfortunately, the maximum performance obtainable for a given operating frequency F is also related to the supply voltage as follows: $I_{d(sat)} = \beta(V_{dd} - V_t)^\alpha$, where $I_{d(sat)}$ is the drain current at saturation, $V_{dd}$ is the drain-to-source voltage, and $V_t$ is the threshold voltage. $\alpha$ is a process dependent parameter and is typically taken to be 2, but may be between one and two and $\beta$ has its usual meaning, well known in the art, including the width and length parameters for an metal-oxide semiconductor (MOS) transistor. Consequently, because systems are designed to operate at a voltage level that meets their peak computational performance demands, they consume significant amounts of power which is not useful at times when the peak computational capability is not required. In such systems, power is typically saved by "clock gating." In this approach, the sections of the device or system which are unused have the clocks that drive those sections turned "off." This lowers the effective frequency of operation, resulting in a linear improvement, as indicated by the equation above, essentially by lowering the average frequency by including zero frequency time spans into the average. A need, therefore, exists for a technique that improves the reduction in power consumption for these low power devices, while still delivering sufficient computational performance to complete the tasks desired.

SUMMARY

Briefly, in accordance with one embodiment of the invention, a system includes: a processor, a voltage regulator, and a memory. The voltage regulator is coupled to the processor to adjust the operating voltage of the processor. The memory is coupled to the processor by a memory bus. The memory has stored on it processor instructions that, when executed by the processor, result in modification of the operating frequency of the processor and result in adjustment of the operating voltage of the processor, based, at least in part, on dynamic changes in the processing load of the processor.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

Figure 1:
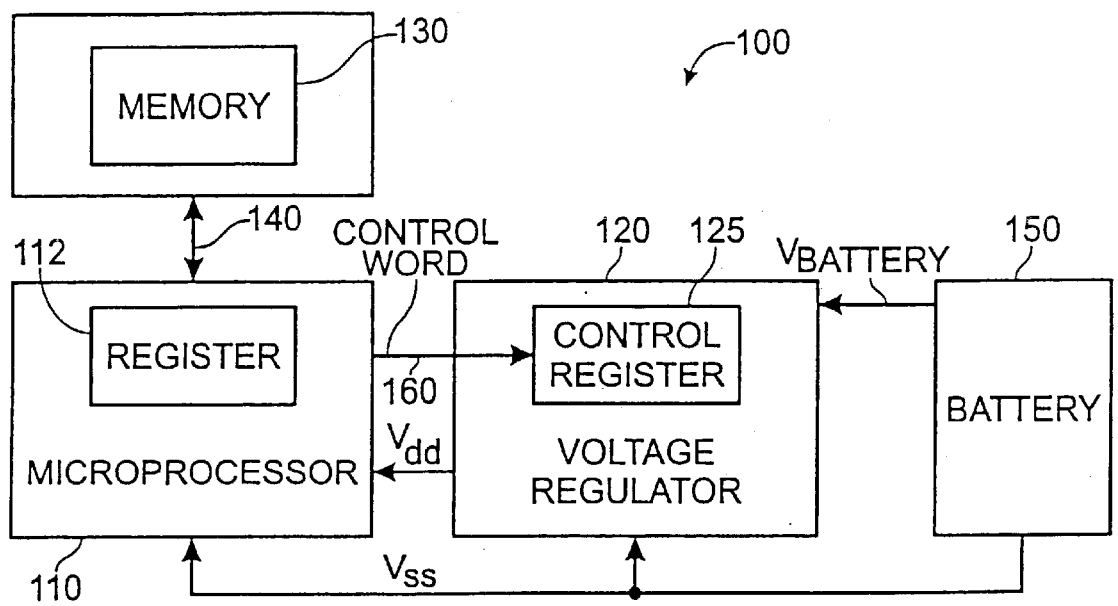
FIG. 1 is a schematic diagram illustrating an embodiment of a system in accordance with the present invention.

In the following detailed description, specific details are set forth in order to provide a thorough understanding of the invention. However, it will be understood by those skilled in the relevant art that the present invention may be practiced without the specific details. In other instances, well-known methods, procedures, components and circuits have not been described in detail so as not to obscure the present invention.

As previously discussed, cell phones and other hand-held portable devices, such as, for example, a personal digital assistant or a global positioning system (GPS) receiver, typically have limited battery capability, making power savings particularly desirable. For example, the batteries employed in devices or systems that weigh no more than approximately several pounds typically have limited capability. Likewise, the trend has been toward an increase in the computing power of such devices. Employing this increased computing power may result in significant power consumption and/or significant additional power consumption. However, a hand-held device may not be consistently called upon to deliver peak performance the entire time that it is being used. For example, such devices may at times be operating in a mode which demands relatively little computational capability, such as, for example, dealing with keyboard input/output, such as key strokes. Likewise, as previously indicated, more complex voltage regulators have become available, particularly in the form of a integrated circuit or embodied on an integrated circuit chip with other circuitry. These regulators may include the capability to both step down the operating voltage or step up the operating voltage for a particular component, such as a processor. This capability provides the opportunity to efficiently provide the desired voltages above or below the battery voltage and, thereby, effectively lengthen the battery lifetime or time between recharges. More specifically, the capability may be provided to supply the desired voltage level dynamically, based at least in part on changes in processor capability utilization, and when these voltage levels are, therefore, desirable, such as when a particular computational task is being executed at the particular time.

As previously indicated, power consumption is related to the operating frequency of a processor in a linear fashion and to its operating voltage level in a square law relationship. Therefore, a technique may be employed that allows a combined linear (eg, frequency) and square law (eg, voltage) reduction improvement in power consumption when the computational demand of a component, such as a processor, for example, is relatively high or relatively low. More specifically, a hand-held device may utilize switched power regulation or the output voltage level may be made programmable. Where this approach is employed, the operating voltage for the processor, for example, and, hence, the power consumption, may be controlled by the processor itself, through the execution of processor instructions. In addition to the processor operating voltage level, the operating frequency of the processor may likewise be controlled in a dynamic, on-demand, fashion. In this context, the term dynamic changes in the processing load of the processor refers to measured or predicted changes in processing load that have the potential for a sufficient enough impact on the power consumption and/or performance by the processor to make modifications in the operating frequency or adjustments in the operating voltage desirable. In one particular embodiment, although the invention is not limited in scope in this respect, the processor instructions, while being executed by the processor, may determine that a computationally intensive task is beginning or is about to be begun. For example, the executable code of an application may include information for the operating system (OS) "loader," in this context the portion of the OS which places new application programs in memory and begins their operation by the processor, so that the loader may execute a subroutine which increases or decreases the power and frequency state of the system to match the performance level intended for this application. In this case the frequency intended for the application to run correctly may be determined by the application programmer via several means, and stored as part of the program. Alternatively, the application may call a predetermined subroutine or OS service to increase or decrease the power and frequency itself either directly or through the OS. The latter may provide an advantage in that it may afford protection of the system from errant applications or where more than one application is running simultaneously. Note that in such a case, where multiple applications are running, the OS can determine the sum of performance demands and deliver the power and frequency for this sum correctly. Of course, this is just one example of how this might be accomplished and the invention is not limited to any particular approach. Therefore, in one embodiment, the execution of these instructions may result, for example, in the setting of binary digital signals or bits within specific registers which control the operating frequency and the operating voltage level, thus allowing the power consumption to be reduced for those tasks which are not particularly computationally intensive, while still delivering the desired high computational performance. In this particular embodiment, when the computationally intensive task has been completed by the processor, the processor instructions being executed may then, by setting binary digital signals or bits, which again control the operating frequency and the operating voltage level of the processor, reduce power consumption to a relatively low state. In one particular embodiment, although, again, the invention is not limited in scope in this respect, as will become more clear later, the clock driving the processor may be permitted to continue to operate, thus allowing the processor to successfully execute processor instructions soon after such voltage/frequency changes, while still saving significant amounts of power.

FIG. 1 is a schematic diagram illustrating one embodiment of a system in accordance with the present invention. Of course, as previously indicated, and as will be explained in more detail hereinafter, the invention is not limited in scope to this particular embodiment. Nonetheless, embodiment 100 shown in FIG. 1 includes a processor 110, such as a microprocessor, a voltage regulator 120, and a memory 130. As illustrated, memory 130 is coupled to processor 110 via a memory bus 140. Furthermore, power is supplied to the system via a battery 150, although it will, of course, be understood that such a system is to typically be provided without battery 150, because conventionally batteries may be obtained from a variety of sources. Furthermore, specific components of some embodiments of a system in accordance with the invention, such as the processor, may likewise be provided or sold separately for later incorporation into a system, for example, and still fall within the scope of the invention.

In this particular embodiment, voltage regulator 120 is coupled to processor 110 to adjust the operating voltage, $V_{dd}$ in FIG. 1, of processor 110. In this embodiment, this occurs based, at least in part, on binary digital signals that are provided to the voltage regulator, as explained in more detail below. As illustrated in FIG. 1, these binary digital signals are provided via a control word which is loaded into control register 125 in this particular embodiment. Memory 130, which may comprise, for example, a dynamic random access memory (DRAM), has stored processor instructions, that, when executed by processor 110, result in modification of the operating frequency of processor 110 and result in adjustment of the operating frequency of processor 110 based, at least in part, on dynamic changes in the processing load of the processor.

In this particular embodiment, a control word is provided by microprocessor 110 to voltage regulator 120 via a control bus 160, although, again, the invention is not limited in scope in this respect. Nonetheless, in this specific embodiment, the "control register" may be "memory mapped." More specifically, one or more selected or designated addressable memory locations that do not correspond with any actual memory locations within memory 130, may function or operate as a portion of memory 130. That is, it is transparent to the processor that it is addressing the control register when the processor reads or writes to this selected memory address location or memory address locations. In such an embodiment, voltage regulator 120 may be coupled to the control register located in memory 130 by a memory bus 140(not shown in FIG. 1). Therefore, a write operation to the selected or designated locations may signal a change in the control register. Of course, again, the invention is not limited in scope to this embodiment, for example, the voltage regulator control voltage may correspond to an input/output (I/O) port rather than a memory location.

In this particular embodiment, the voltage level delivered to microprocessor 110 by voltage regulator 120 may be adjusted by setting the control register binary digital signals based on the frequency desirable to complete the specific microprocessor application in real time. Thus, in such an embodiment, the processor instructions stored on memory 130 and being executed by processor 110 may assess the computational intensity or processing load of a particular task and adjust the bits of control register 125 accordingly. Therefore, in this particular embodiment, voltage regulator 120 is programmable. As illustrated in FIG. 1, memory 130, microprocessor 110 and voltage regulator 120 are each on separate integrated circuit chips, although, the invention is not limited in scope in this respect. Furthermore, system 100 may include a nominal operating voltage for a large percentage of the tasks to be executed by the microprocessor. Voltage regulator 120 is coupled to processor 110 and is capable in this embodiment of adjusting the operating voltage of processor 110 up and/or down from this nominal operating voltage based, at least in part, on the binary digital signals provided to voltage regulator 120, such as those provided to control register 120 in this particular embodiment. For example, tasks may be on a continuum from computationally intensive to not computationally intensive. At one end of this continuum, voice recognition, might be an example of a computationally intensive task, and at the other end, keyboard input/output, such as key strokes, might be an example of a not computationally intensive task. Likewise, an example of a task between the two extremes, where a nominal operating voltage may be employed, might include performing network operations. Of course, these tasks are merely provided as examples, and the invention is not limited to these tasks or to this continuum, or to employing a continuum at all. As previously indicated, in one embodiment, the binary digital signals may be written to one or more selected or designated memory location addresses that have been mapped to the control register.

In one embodiment, although, again, the invention is not limited in scope in this respect, memory 130 has stored thereon processor instructions that, when executed by processor 110, result in the processor being placed in sleep mode before adjustment of the operating voltage of the processor by voltage regulator 120. In this embodiment, placing the microprocessor in sleep mode comprises finishing current operations, stopping the internal clocks, and stopping the microprocessor phase locked loop (PLL) or similar circuit. Once this has occurred, as previously indicated, the processor instructions being executed by the processor may provide binary digital signals to a control register, such as control register 125, which results in the operating voltage of processor 110 being changed by voltage regulator 120. In one embodiment, although the invention is not limited in scope in this respect, the processor instructions may result in the processor waiting an amount of time sufficient after this adjustment of the operating voltage to permit the voltage adjustment to have been successfully accomplished. One skilled in the art will appreciate that there are a number of ways to specify this amount of time and the various alternative ways shall not be enumerated here, however, it is contemplated that all fall within the scope of the invention. Likewise, in an alternative embodiment, the processor instructions, when executed by the processor, may result in the processor verifying, after adjustment of the operating voltage, that the voltage adjustment has been successfully accomplished. As one example, this could be accomplished by reading another register which stores the output signal of an analog to digital (A to D) converter which monitors the voltage reference. Such a device may substantially use portions of the voltage regulator control mechanism, eg., an A to D converter is part of some digital to analog (D to A) converters which may be employed to generate the digital control of the supply voltage as part of the voltage regulator. Modern PC motherboard designs have a number of such A to D ports which can be read by the operating system and basic input-output system (BIOS) to monitor that system voltages and temperatures are within their nominal settings. For example, they are presently used primarily to signal the system to halt if a component fails. This is just one example of an approach and the invention is not restricted in scope to this particular technique. In any event, the operating frequency of the processor may then be modified by initiating operation of the processor at a modified frequency after the prior events have been successfully completed, that is, in this particular embodiment, after placing the processor in sleep mode and successfully modifying the operating voltage of the processor. This may be implemented, for example, by renewing operation of the phase locked loop of the microprocessor so that it locks onto this modified frequency, where a PLL is employed. This may be accomplished by any one of a number of techniques and the invention is not limited in scope to any particular technique. For example, the divider ratio for the input signal of the phase locked loop may be modified although, again, the invention is not limited in scope in this respect. Furthermore, as with the voltage regulator, this may be signaled by writing to a memory location that is mapped to a particular processor register for this purpose, such as register 112 in FIG. 1. Once the PLL has locked onto the modified frequency, the internal clocks of the microprocessor may be restarted and normal operation of the system may be resumed from the point at which it stopped. After the PLL has been stopped, restarting the PLL and having it lock onto the modified frequency in one embodiment may take on the order of 10 microseconds, for example. Of course, this is dependent, at least in part, on the range of frequencies of interest and the voltage, so this is provided simply as an example. However, relative to clock speed, for example, this may in some cases be a time consuming operation.

Once the operation that resulted in the modification of the operating voltage level and operating frequency level has been completed by the processor, the same approach or technique may then be employed to again change the operating voltage level and the operating frequency level back to the previous level. Thus, it will be appreciated that where a nominal voltage level and a nominal operating frequency exists for a particular embodiment, this technique may be employed to reduce the operating frequency and operating voltage level where a particularly less computationally intensive task is sensed or recognized and likewise the operating voltage level and operating frequency may be increased where a particularly computationally task is sensed or recognized. As previously described, examples include voice recognition for a computationally intensive task, network processing for a nominal task, and keyboard input/output for a low or not computationally intensive task, although these are merely illustrative examples. Therefore, the invention is not limited in scope to only a step up in voltage and frequency or only a step down in voltage and frequency, although, such embodiments are also possible and within the scope of the invention.

In another embodiment, in accordance with the invention, a phase locked loop of the microprocessor, where a microprocessor and PLL are employed, may continue operating while the operating voltage level is varied. One advantage of this particular embodiment is that operations may be completed sooner after the voltage/frequency levels are being changed. For example, as previously explained, where the PLL is stopped, it may take some time for the PLL to reestablish lock at the modified frequency; however, where the PLL continues to operate and the internal clocks have been stopped, the internal clocks may be restarted in a single clock pulse, which is advantageously less time. In this particular embodiment, memory 130 has stored processor instructions that, when executed by the processor, result in the processor being placed in idle mode before adjusting the operating voltage of the processor and before modifying the operating frequency of the processor. In an alternative embodiment, the internal clock may be driven directly from the PLL reference clock during PLL frequency changes, where a PLL is employed. In this manner, the processor continues to process information and can react to external events, eg., interrupts, albeit at the slower rate of the reference clock. This mode is a power saving means when the processor is waiting to process information coming in from the bus. In this particular environment, in idle mode, the processor finishes current operations and then stops the internal clocks. However, the phase locked loop (PLL) of the processor, in this embodiment, for example, continues to operate. In this particular approach, while the phase locked loop continues to operate, the operating voltage of the processor is adjusted by the voltage regulator and the operating frequency of the processor is modified, as previously described, for example. The dynamic processing load, as previously indicated, may be recognized or determined by the processor as it executes the stored processor instructions. For example, a processor may recognize that a significantly more computationally intensive or significantly less computationally task is about to begin for a particular period of time. For example, although the invention is not limited in scope in this respect, where the processor is performing voice recognition, this may result in some computationally intensive tasks being performed for a relatively short period of time.

Figure 5:
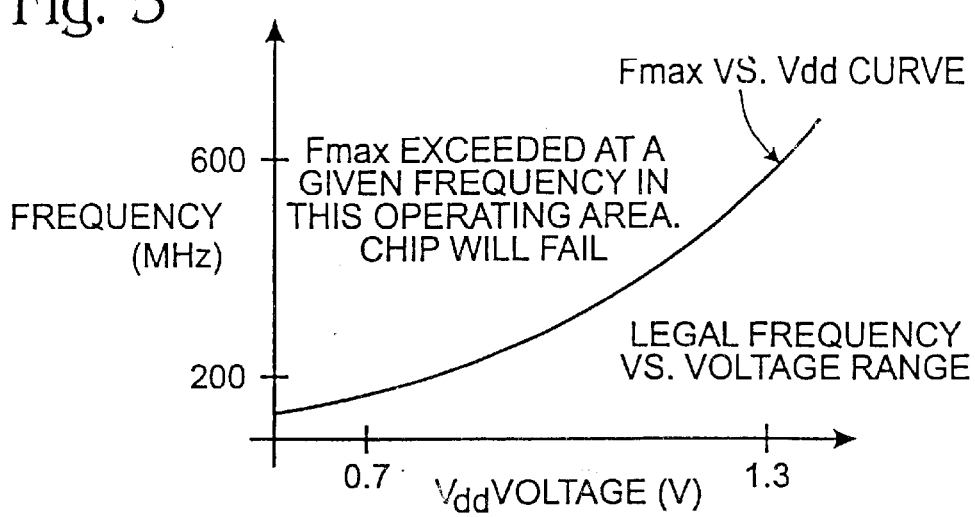
FIG. 5 is a graph illustrating the $F_{max}$ versus $V_{dd}$ curve for an embodiment in accordance with the present invention.
Figure 6:
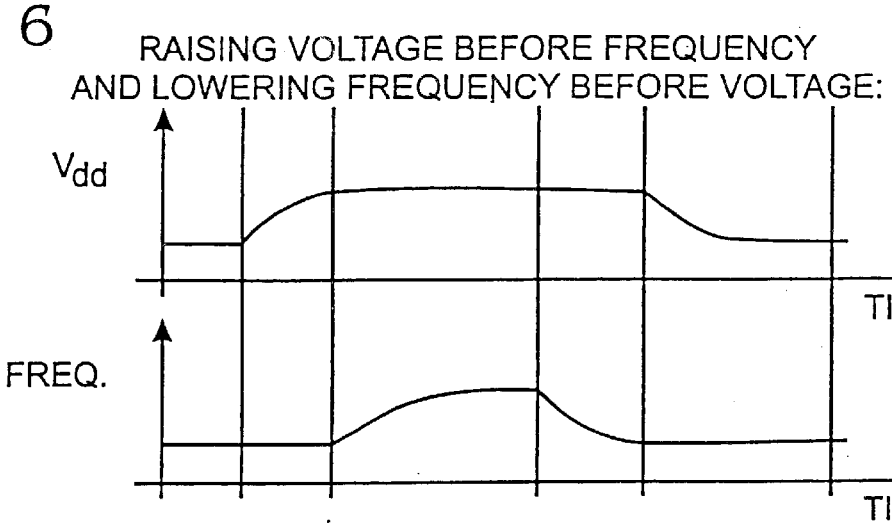
FIG. 6 is a plot illustrating one approach to raising and lowering voltage and frequency for an embodiment in accordance with the invention.
Figure 7:
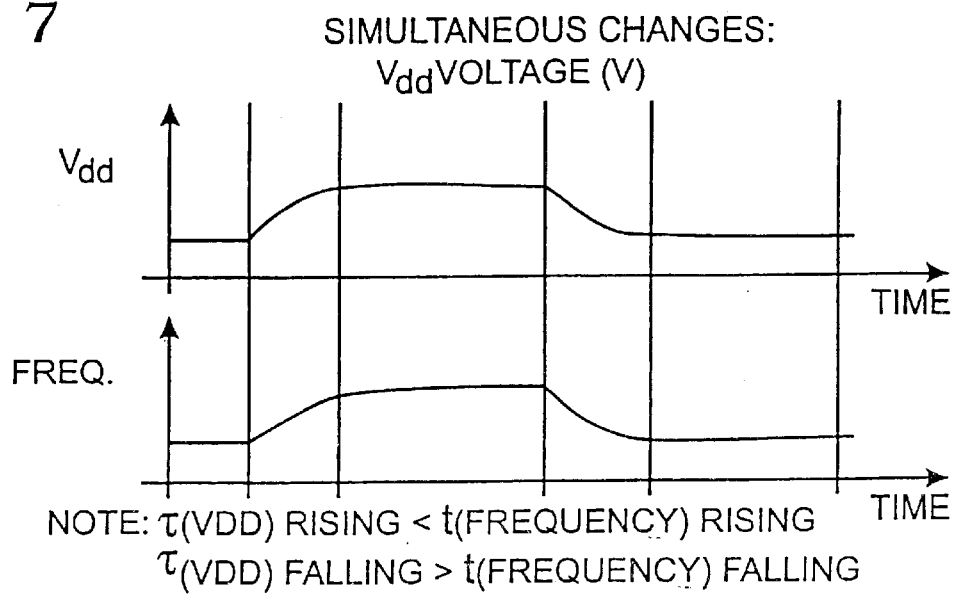
FIG. 7 is a plot illustrating another approach to raising and lowering voltage and frequency for an embodiment in accordance with the invention.

There are also a number of different approaches to adjusting the operating voltage and modifying the operating frequency in this particular embodiment. For example, this may be accomplished sequentially or alternatively, depending on certain parameters, these may be executed concurrently. For example, the amount of time it takes to raise the operating voltage may be relatively short in comparison with the amount of time it takes to increase the frequency of the phase locked loop. Therefore, if these operations are performed concurrently, by the time the operating frequency has been raised, both operations will have been successfully completed. Alternatively, the time constant for lowering the operating voltage may be made relatively larger than the time constant for lowering the operating frequency of the PLL. Again, this may represent a situation in which it may be desirable to perform these operations concurrently so that by the time the operating voltage has been lowered to the desired level, both operations will have been successfully completed. FIG. 7 illustrates where these operations are performed concurrently for an embodiment of the invention. It will, of course, be understood that in this context, concurrently does not mean that both operations are being performed for the entire time, but rather that the operations overlap for at least a portion of the time. It will, furthermore, be appreciated by one of ordinary skill in the art that the particular details to successfully accomplish this may vary with the particular task or tasks being executed, as well as a variety of other factors. Therefore, the invention is not limited in scope to one particular approach. Furthermore, in an alternative embodiment, it may be desirable to modify the operating frequency and adjust the operating voltage sequentially. Therefore, once the microprocessor has been placed in idle mode, the processor PLL is signaled to reduce the output clock frequency. As previously indicated this may be accomplished by any one of a number of techniques, such as by modifying the divider ratio for the input signal applied to the PLL, where a PLL is employed. Likewise, depending on the particular embodiment, the processor instructions being executed may either indicate that the processor wait a sufficient period of time to ensure that the desired operating frequency has been achieved or, alternatively, the processor determines whether the appropriate operating frequency has been reached. As one example, possibly through a timer which takes the same length of time as the nominal lock time of the PLL under predictable changes, such as, a table lookup programmed timer, or alternatively, by receiving a signal from the PLL which, based on the activity in the charge pump, based on information from the frequency detector may send a signal to the processor, which indicates a locked or not locked condition. Such a frequency lock detector is well known to those skilled in the art and will not be describe in detail here. However, again, the invention is not limited in scope to a particular approach to accomplish this. In any event, once the desired operating frequency has been achieved, as previously described, the processor may execute processor instructions that signal the voltage regulator to adjust the operating voltage. In this particular embodiment, it is desirable to employ the previously described order, that is modifying the operating frequency and then adjusting the operating voltage, where it is desired to reduce power consumption. Alternatively, where it is desired to increase power consumption, such as when a computationally intensive task is to be completed, as previously described, then it may be desirable to signal the voltage regulator to move to a higher voltage and then signal the microprocessor to increase the output clock frequency. FIG. 6 illustrates raising the operating voltage before the operating frequency and then lowering the operating frequency before the operating voltage for a particular embodiment of the invention. Here, computation need not cease while the voltage and frequency changes are made, so long as the operation runs under the curve illustrated in FIG. 5. Therefore, the processor does not violate its circuit speed/voltage operating envelope during the changes. This may be implemented, for example, by forcing the time constants by circuit design to be maintained as in the figure during increases or decreases in frequency and voltage.

In this particular embodiment, as illustrated by the graph in FIG. 5, the operating frequency is maintained below a maximum frequency level that may be successfully delivered at the given voltage level. By maintaining the operating frequency below this level for a given operating voltage, although operation of the microprocessor is halted in this particular embodiment, there is little or no risk of a functional failure in the rest of the circuitry due to the internal circuitry maintaining state being idle. Alternatively, the internal circuitry may be run at the reference frequency as stated above, which will allow work to be accomplished with little or no possibility of operating at a frequency above the frequency available at the given (temporally varying) operating voltage. More specifically, the operating frequency is maintained below a level so that the internal circuitry will successfully keep pace with the clock at that particular operating voltage level. Therefore, there is little or no risk of a cycle produced by the clock generator being shorter than the circuitry is capable of performing at the internal voltage.

Figure 2:
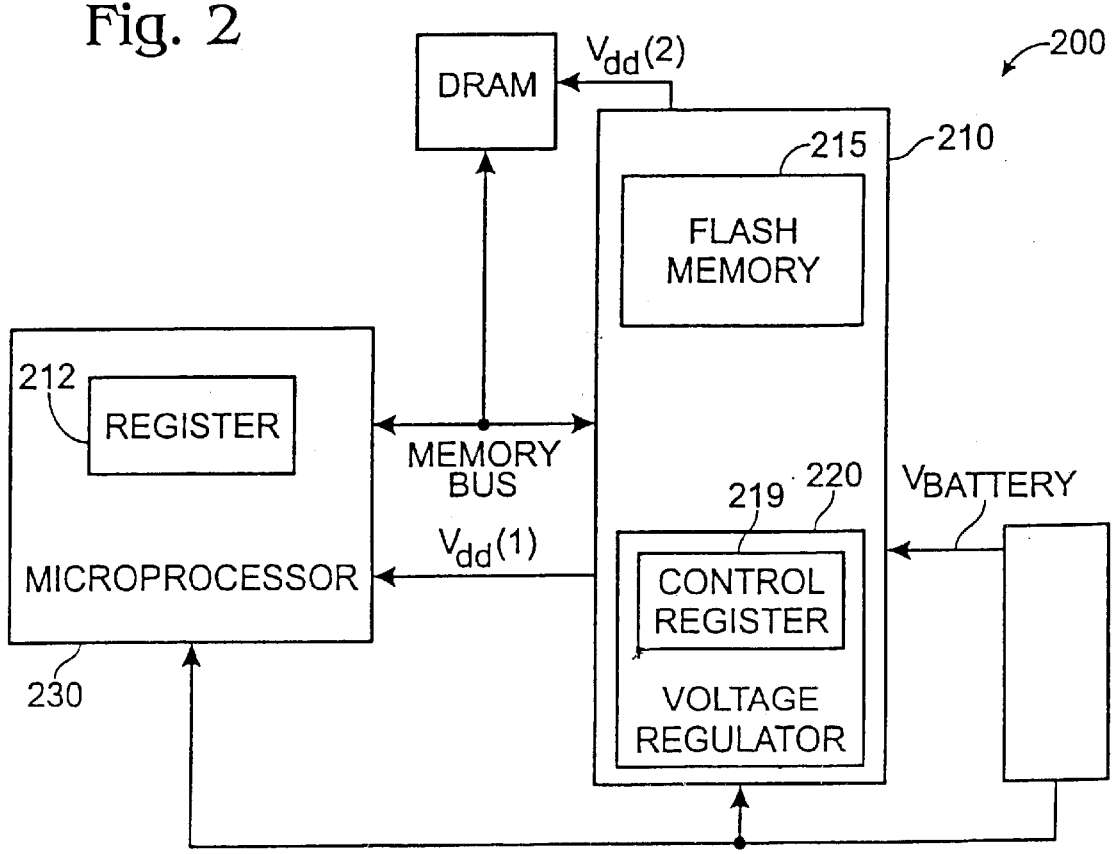
FIG. 2 is a schematic diagram illustrating another embodiment of a system in accordance with the present invention.

Of course, in alternative embodiments, these various system components may be integrated. FIG. 2 is, therefore, an example of another embodiment of a system in accordance with the present invention. In this particular embodiment, 200, the voltage regulator and the flash memory are integrated on a single integrated circuit chip 210. One desirable aspect is that the manufacturing processes employed to produce flash memory allow higher voltages, which is employed, as is well known by those skilled in the art, at least in part for proper flash programming and erasing, and are, therefore, more amenable to the fabrication of relatively efficient voltage regulators. Further, the additional processing and the nature of that processing, specifically the use of two polysilicon gate layers, supports the ability of such processes to include passive analog components, for example, more easily than a conventional logic process as is typically employed for microprocessor fabrication. Likewise, employing flash memory is not a significant restriction in typical state of the art systems as it is typically used as a means of program storage in such hand-held systems. As illustrated in FIG. 2, in this particular embodiment, control register 217 which is integrated on chip 210, is accessed in substantially the same manner as the flash memory control circuitry. Therefore, the control register is accessed by the same circuitry which controls the read and write operations to flash memory 215. Thus, another advantage of this approach is that no additional bus is employed on the microprocessor side of the system, as illustrated in FIG. 2. This approach is similar to that previously described in which a control register is "memory mapped" so that the memory bus may be employed to transfer the binary digital control signals used to program the voltage regulator. However, in this particular embodiment, this is accomplished by integrating the voltage regulator with the flash memory on a single integrated circuit chip. Likewise, the voltage regulator may also provide other voltage signal levels, such as for static-dynamic random access memory (SDRAM) or other system level devices, in addition to the operation it performs with respect to processor 230 in FIG. 2.

Figure 3:
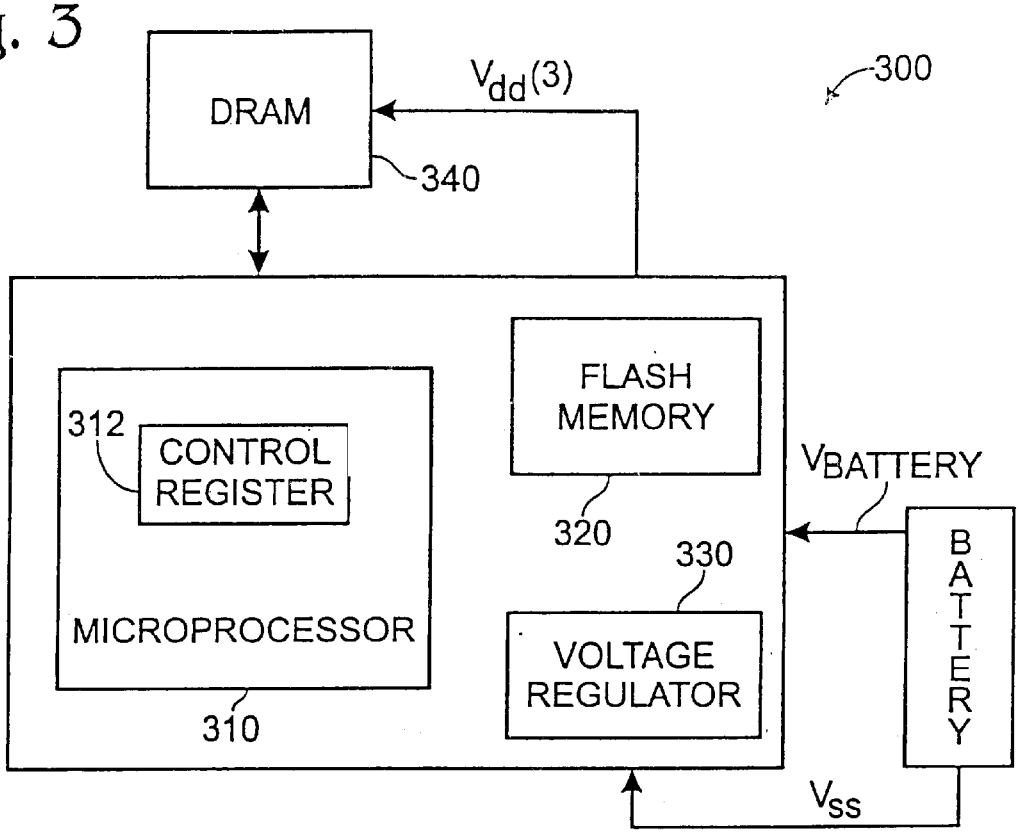
FIG. 3 is a schematic diagram illustrating yet another embodiment of a system in accordance with the present invention.
Figure 4:
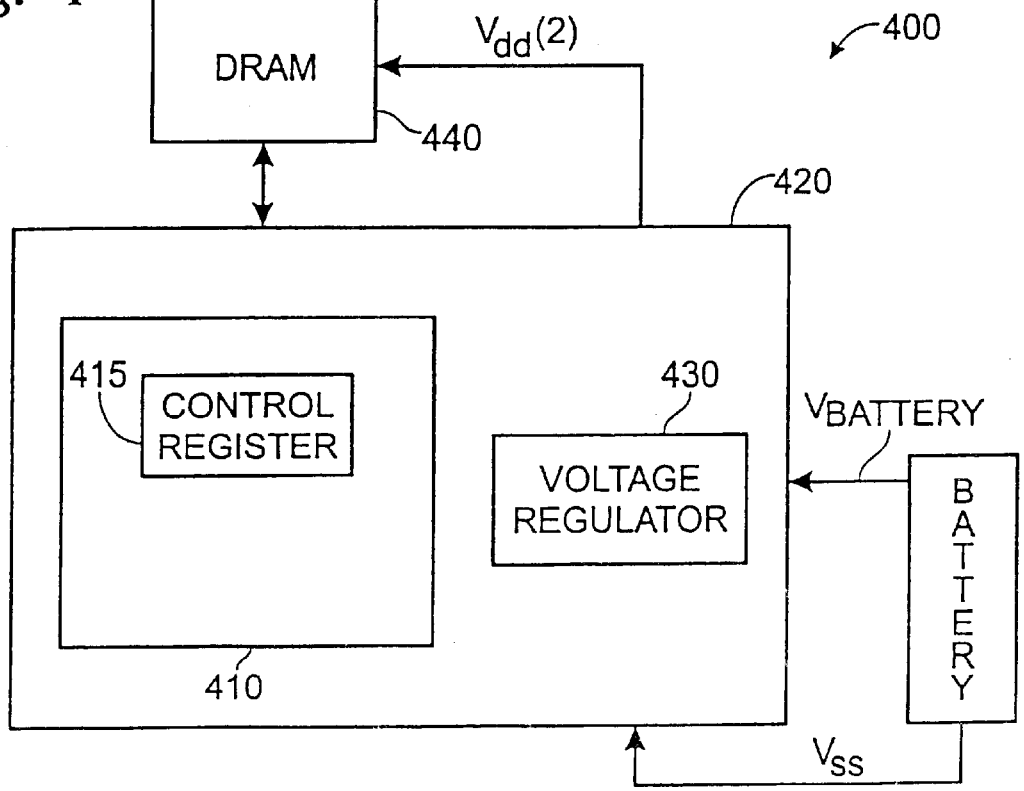
FIG. 4 is a schematic diagram illustrating still another embodiment of a system in accordance with the present invention.

FIG. 4 is a schematic diagram of yet still another embodiment. As illustrated, in this embodiment, the processor and voltage regulator are integrated on a single integrated circuit chip. FIG. 3 is a schematic diagram of still another embodiment that employs an even higher level of integration than the embodiments illustrated in FIGS. 2 and 4. In this particular embodiment, processor 310, flash memory 320 and voltage regulator 330 are integrated on a single integrated circuit chip. As illustrated in FIG. 3, this particular embodiment may supply voltage signal levels for external devices, such a DRAM 340 illustrated in FIG. 3. One advantage of this particular embodiment is that control register 312 in FIG. 3 may be integrated onto microprocessor 310 directly. For example, although the invention is not limited in scope in this respect, in the well-known ARM architecture, the co-processor control registers may be utilized to control the voltage operating levels in substantially the same manner as they may be employed to control the clock frequency, and other power-down modes, such as idle and other possible modes. In one particular embodiment, the register used comprises the ARM® co-processor register (CP) CP-14 register 7, which contains the clock and power management functions, although the invention is not restricted in scope in this respect. In this register, some bits control the voltage state and some control the clock frequency (PLL multiplier). For example, a change operation may be initiated upon detection of a write to this register in a manner which will be familiar to one skilled in the art. Therefore, a single register may be employed in this embodiment in which the adjustment of the operating voltage and the modification of the operating frequency is accomplished in a single, atomic operation, although, of course, the invention is not limited in scope in this respect. It is noted that the embodiment illustrated in FIG. 4 provides this advantage as well.

Furthermore, other embodiments may comprise, rather than a system, alternatively, an article including a storage medium, such as, for example a computer- or machine-readable storage medium, such as a hard disk, a compact disk(CD), or a diskette. In such an embodiment, the storage medium may have stored thereon instructions, such as processor instructions. The processor instructions may be such that when executed in a system, such as one including a voltage regulator coupled to the processor, modification of the operating frequency and adjustment of the operating voltage of the processor results, based, at least in part, on dynamic changes in the processing load of the processor. Such embodiments may include additional features, such as those previously described and illustrated with respect to the figures, although the invention is not limited in scope in this respect. Furthermore, an embodiment may alternatively include a method of reducing the power consumption of a processor in accordance with the invention, such as by modifying the operating frequency and adjusting the operating voltage of a processor in the manner described in the previously discussed embodiments, although, again, the invention is not limited in scope in this respect.

While certain features of the invention have been illustrated and described herein, many modifications, substitutions, changes, and equivalents thereof will now occur to those skilled in the art. It is, therefore, to be understood that the appended claims are intended to cover all such modifications and changes as fall within the true spirit of the invention.

What is claimed is:

1. A system comprising:

a processor, a voltage regulator, and a flash memory;

wherein said voltage regulator is coupled to said processor to adjust the operating voltage of said processor;

said flash memory being coupled to said processor via a memory bus and said flash memory having stored thereon processor instructions that, when executed by said processor, result in modification of the operating frequency of said processor and result in adjustment of said operating voltage of said processor based, at least in part, on dynamic changes in the processing load of said processor; and wherein said flash memory and said voltage regulator are integrated on one integrated circuit chip.

2. The system of claim 1, wherein said processor is also integrated on said one integrated circuit chip.

3. The system of claim 1, wherein said processor is not integrated on said one integrated circuit chip containing said flash memory and said voltage regulator.

4. A system comprising:

a processor, a voltage regulator, and a memory;

wherein said voltage regulator is coupled to said processor to adjust the operating voltage of said processor;

said memory being coupled to said processor via a memory bus and said memory having stored thereon processor instructions that, when executed by said processor, result in modification of the operating frequency of said processor and result in adjustment of said operating voltage of said processor based, at least in part, on dynamic changes in the processing load of said processor;

wherein said voltage regulator is coupled to said processor to be capable of adjusting the operating voltage of said processor up and down from a nominal operating voltage based at least in part on binary digital signals provided to said voltage regulator; and wherein said memory has stored thereon processor instructions that, when executed by said processor, result in said binary digital signals provided to a selected register integrated on an integrated circuit chip that includes said voltage regulator.

5. A system comprising:

a processor, a voltage regulator, and a memory;

wherein said voltage regulator is coupled to said processor to adjust the operating voltage of said processor;

said memory being coupled to said processor via a memory bus and said memory having stored thereon processor instructions that, when executed by said processor, result in modification of the operating frequency of said processor and result in adjustment of said operating voltage of said processor based, at least in part, on dynamic changes in the processing load of said processor;

wherein said voltage regulator is coupled to said processor to be capable of adjusting the operating voltage of said processor up and down from a nominal operating voltage based at least in part on binary digital signals provided to said voltage regulator; and wherein said memory has stored thereon processor instructions that, when executed by said processor, result in said binary digital signals being written to selected memory mapped locations that correspond with the memory locations in a selected register.

6. A system comprising:

a processor, a voltage regulator, and a memory;

wherein said voltage regulator is coupled to said processor to adjust the operating voltage of said processor;

said memory being coupled to said processor via a memory bus and said memory having stored thereon processor instructions that, when executed by said processor, result in modification of the operating frequency of said processor and result in adjustment of said operating voltage of said processor based, at least in part, on dynamic changes in the processing load of said processor;

wherein said voltage regulator is coupled to said processor to be capable of adjusting the operating voltage of said processor up and down from a nominal operating voltage based at least in part on binary digital signals provided to said voltage regulator; and wherein said memory has stored thereon processor instructions that, when executed by said processor, result in said processor being placed in idle mode before adjustment of the operating voltage of said processor by said voltage regulator and before modification of the operating frequency of said processor.

7. The system of claim 6, wherein said memory has stored thereon processor instructions that, when executed by said processor, result in the processor adjusting the operating voltage of said processor and modifying the operating frequency of said processor concurrently.

8. The system of claim 7, wherein said processor instructions, when executed result in adjustment of the operating voltage while concurrently modifying the operating frequency.

9. The system of claim 6, where in the processor instruction, when executed, result in modifying the operating frequency of said processor by a change in a divider ratio of a phase locked loop (PLL) input signal of said processor.

10. The system of claim 6, wherein the processor instructions, when executed, result in modification of the operating frequency before adjustment of the operating voltage.

11. The system of claim 6, wherein the processor instructions, when executed, result in adjustment of the operation frequency before modification of the operating voltage.

12. The system of claim 6, wherein said processor instructions, when executed, result in modification of the operating frequency while concurrently adjusting the operating voltage.

13. A system comprising:

a processor, a voltage regulator, and a memory;

wherein said voltage regulator is coupled to said processor to adjust the operating voltage of said processor;

said memory being coupled to said processor via a memory bus and said memory having stored thereon processor instructions that, when executed by said processor, result in modification of the operating frequency of said processor and result in adjustment of said operating voltage of said processor based, at least in part, on dynamic changes in the processing load of said processor;

wherein said voltage regulator is coupled to said processor to be capable of adjusting the operating voltage of said processor up and down from a nominal operating voltage based at least in part on binary digital signals provided to said voltage regulator; and wherein said memory has stored thereon processor instructions that, when executed by said processor, result in said processor being placed in sleep mode before adjustment of the operating voltage of said processor by said voltage regulator.

14. The system of claim 13, wherein said memory has stored thereon processor instructions that, when executed by said processor, result in the processor waiting an amount of time sufficient after adjustment of the operating voltage to permit the voltage adjustment to have been successfully accomplished.

15. The system of claim 13, wherein said memory has stored thereon processor instructions that, when executed by said processor, result in the processor, after adjustment of the operating voltage, verifying that the voltage adjustment has been successfully accomplished.

16. A system comprising:
 a processor, a voltage regulator, and a memory;
 wherein said voltage regulator is coupled to said processor to adjust the operating voltage of said processor;
 said memory being coupled to said processor via a memory bus and said memory having stored thereon processor instructions that, when executed by said processor, result in modification of the operating frequency of said processor and result in adjustment of said operating voltage of said processor based, at least in part, on dynamic changes in the processing load of said processor;
 wherein said memory further includes processor instructions stored thereon that, when executed by said processor, result in modification of the operating frequency of said processor up and down from a nominal operating frequency based, at least in part, on dynamic changes in the processing load of said processor; and
 wherein said memory further includes processor instructions stored thereon that, when executed by said processor, result in modification of the operating frequency of said processor by placing said processor in sleep mode and later, after successfully modifying the operating voltage of said processor, initiating operation of the processor at the modified frequency.

17. An article comprising:
 a storage medium, said storage medium having stored thereon, instructions that, when executed by a processor in a system, said system including a voltage regulator coupled to said processor to adjust the operating voltage of said processor, result in modification of the operating frequency of said processor and result in adjustment of said operating voltage of said processor based, at least in part, on dynamic changes in the processing load of said processor;
 wherein said instructions include the capability, when executed by said processor, to result in said voltage regulator adjusting the operating voltage of said processor up and down from a nominal operating voltage based at least in part on binary digital signals provided to said voltage regulator; and
 wherein said instructions, when executed by said processor, result in said binary digital signals being provided to a selected register integrated on an integrated circuit chip that includes said voltage regulator.

18. An article comprising:
 a storage medium, said storage medium having stored thereon, instructions that, when executed by a processor in a system, said system including a voltage regulator coupled to said processor to adjust the operating voltage of said processor, result in modification of the operating frequency of said processor and result in adjustment of said operating voltage of said processor based, at least in part, on dynamic changes in the processing load of said processor;
 wherein said instructions, when executed by said processor, result in the processor adjusting the operating voltage of said processor and modifying the operating frequency of said processor concurrently; and
 wherein said instructions, when executed by said processor, result in said processor being placed in idle mode before adjustment of the operating voltage of said processor by said voltage regulator and before modification of the operating frequency of said processor.

19. An article comprising:
 a storage medium, said storage medium having stored thereon, instructions that, when executed by a processor in a system, said system including a voltage regulator coupled to said processor to adjust the operating voltage of said processor, result in modification of the operating frequency of said processor and result in adjustment of said operating voltage of said processor based, at least in part, on dynamic changes in the processing load of said processor;
 wherein said instructions, when executed by said processor, result in the processor adjusting the operating voltage of said processor and modifying the operating frequency of said processor concurrently; and
 wherein said instructions, when executed by said processor, result in said processor being placed in sleep mode before adjustment of the operating voltage of said processor by said voltage regulator and before modification of the operating frequency of said processor.

20. A method of reducing the power consumption of a processor comprising:
 modifying the operating frequency of said processor; and
 adjusting the operating voltage of said processor;
 wherein said modification and said adjustment is based, at least in part, on dynamic changes in the processing load of said processor; and
 further comprising placing said processor in idle mode before adjustment of the operating voltage of said processor by said voltage regulator and before modification of the operating frequency of said processor.

21. A method of reducing the power consumption of a processor comprising:
 modifying the operating frequency of said processor; and
 adjusting the operating voltage of said processor;
 wherein said modification and said adjustment is based, at least in part, on dynamic changes in the processing load of said processor; and
 further comprising placing said processor in sleep mode before adjustment of the operating voltage of said processor by said voltage regulator and before modification of the operating frequency of said processor.

* * * * *